United States Patent Office 3,168,517
Patented Feb. 2, 1965

3,168,517
NOVEL 2-PHENYLAMINO-4,5-BENZO-6H-1,3-THIAZINE DERIVATIVES
Otto Behner, Cologne-Stammheim, Hans Henecka, Wuppertal-Elberfeld, Friedrich Hoffmeister, Wuppertal-Vohwinkel, Horst Kreiskott, Wuppertal-Elberfeld, Werner Meiser, Wuppertal-Vohwinkel, and Hans Werner Schubert and Wolfgang Wirth, Wuppertal-Elberfeld, Germany, assignors to Farbenfabriken Bayer Aktiengesellschaft, Leverkusen, Germany, a corporation of Germany
No Drawing. Filed July 5, 1963, Ser. No. 293,188
Claims priority, application Germany July 5, 1962
5 Claims. (Cl. 260—243)

This invention relates, in general, to organic chemistry, and involves the provision of novel derivatives of 2-phenylamino-4,5-benzo-6H-1,3-thiazines. In particular, the invention is directed to the provision of certain compounds of the general class described which are found to possess unusual and outstanding pharmacodynamic activities. The invention additionally involves the provision of several alternate syntheses for the production of these compounds.

It has been known heretofore that one may obtain unsubstituted 2-phenylamino-4,5-benzo-6H-1,3-thiazine by heating N-phenyl-N'-(2-hydroxymethylphenyl)-thiourea with hydrochloric acid [H. G. Söderbaum, O. Widmann, Ber. 22, 1671 (1889); C. Paal, L. Vanvolxem, Ber. 27, 2415 (1894)]. Additionally, as is also well known, the same compound is obtained by boiling 2-amino-4,5-benzo-1,3-thiazine or 2-mercapto-4,5-benzo-1,3-thiazine with aniline [S. Gabriel, T. Posner, Ber. 28, 1033 (1895); C. Paal, O. Commerell, Ber. 27, 2430 (1894); C. Paal, L. Vanvolxem, Ber. 27, 2419 (1894)], or by heating N-phenylthiourea with the hydrochloride of 2-aminobenzyl chloride [S. Gabriel, T. Posner, Ber. 28, 1033 (1895)]. Furthermore, the 2-p-tolylamino compound which is obtained by boiling 2-mercapto-4,5-benzo-1,3-thiazine with p-toluidine [Ber. 27, 2433 (1894)] is also known. The foregoing compounds, however, possess little or no pharmacological activity.

The present invention is based, in part, on the discovery that compounds of the general class described which possess truly outstanding pharmacodynamic activity are produced when:

(a) Poly-substituted phenyl mustard oils are added to 2-aminobenzyl alcohol, which may carry further substituents in the benzene ring, to form the corresponding thiourea, and the latter is then treated with an acid, or (b) Poly-substituted phenyl mustard oils are treated with 2-aminobenzyl halide, which similarly may also carry further substituents in the benzene ring, or (c) N-phenyl thioureas, poly-substituted in the benzene ring, are treated with a salt of a 2-aminobenzyl halide, which may again carry further substituents in the benzene ring, or (d) Aromatic amines, poly-substituted in the benzene ring, are reacted with 2-halomethyl phenyl mustard oil, which may also be further substituted in the benzene ring, or (e) Aromatic amines, poly-substituted in the benzene ring, are reacted, in the presence of acids, if desired, with 2-amino-4,5-benzo-1,3-thiazines, or 2-mercapto-4,5-benzo-1,3-thiazines, which also may be further substituted in the benzene ring.

As typical preferred substituent groups within the aforementioned reaction components there are included lower alkyl, aryl, aralkyl, as well as alkoxy, halogen, trihalomethyl, nitro, acylamino, dialkylamino, or hydroxy groups.

The foregoing reactions utilized in the production of the unique compounds of the invention can be effected in aqueous, aqueous-alcoholic or alcoholic solution, as well as in aliphatic, or aromatic solvents, or in the melt, the particular choice of a suitable solvent or diluent merely being determined in established manner having reference to the stability and reactivity of the specific reaction components in each instance. In this connection, the use of solvents or diluents generally proves to be expedient, but is not absolutely necessary.

The compounds of the invention which, as pointed out hereinabove, are unique in the fact that they possess a surprising variety of pharmacodynamic activities, are intended for administration as therapeutic agents in base form or in the form of their salts with non-toxic inorganic or organic acids. Thus, certain specific derivatives of the invention which are substituted several times in the benzo nucleus exhibit a morphine-like analgetic action, whereas certain of the compounds on oral administration act as potent tranquilizers. Additionally, the compounds are found to be possessed of noteworthy coronary activity with respect to increasing oxygen saturation (sinus vein), and also possess relatively strong stimulant effects.

It is believed that the invention may be best understood by reference to the following specific examples illustrating the application of the foregoing principles and procedures in the production of typical compounds of the invention:

Example I

To a thoroughly-stirred boiling suspension of 24.6 grams (0.2 mole) of 2-aminobenzyl alcohol in 100 cubic centimeters of ether, there was added dropwise in the course of 15 minutes a solution of 31 grams (0.2 mole) of 2,6-dimethylphenyl mustard oil in 50 cubic centimeters of ether. The thiourea soon crystallized out. The product was further stirred for 1 hour under reflux, and the ether was then distilled-off. One hundred (100) cubic centimeters of concentrated hydrochloric acid were added to the residue, and the mixture was boiled under reflux for 30 minutes. After cooling, the product was diluted with water and the acid solution extracted several times with methylene chloride. After the methylene chloride had been distilled off, there remained a solid residue which was recrystallized from ethanol. The resultant product, the hydrochloride of 2-(2,6-dimethylphenylamino)-4,5-benzo-6H-1,3-thiazine melts at 185–188° C. The yield was 32% of the theoretical.

Analysis: $C_{16}H_{16}N_2S \cdot HCl$ (305.9):

|  | C | H | Cl | N | S |
|---|---|---|---|---|---|
| Calculated | 63.05 | 5.62 | 11.62 | 9.19 | 10.15 |
| Found | 63.15 | 5.69 | 11.82 | 8.85 | 10.21 |

In an analogous manner, there was obtained from 2-aminobenzyl alcohol and 2-methyl-5-chlorophenyl mustard oil the 2-(2-methyl-5-chlorophenylamino)-6H-4,5-benzo-1,3-thiazine, the hydrochloride of which crystallized from concentrated hydrochloric acid and melts, after recrystallizing from butanol, at 215–221° C. The yield was 73% of the theoretical.

Example II 2-aminobenzyl chloride hydrochloride, in amount of 17.8 grams (0.1 mole), were dissolved in 75 cubic centimeters of absolute ethanol and mixed, while cooling, with 0.1 mole of a sodium ethylate solution. After stirring for a short time, the sodium chloride was filtered off, and the filtrate treated with 15.5 grams (0.1 mole) of 2,6-dimethylphenyl mustard oil.

The mixture was stirred for 2 hours under reflux and the ethanol was subsequently distilled off under vacuum. The residue was recrystallized, where required, from ethanol. The resultant hydrochloride of 2-(2,6-dimethylphenylamino)-4,5-benzo-6H-1,3-thiazine, melts at 185–187° C. and is identical with the product obtained in accordance with the procedure outlined in Example I.

*Example III*

Twenty (20.0) grams (0.1 mole) of N-(2-methyl-5-chlorophenyl)-thiourea (prepared from mustard oil and ammonia, melting point 155° C.) and 17.8 grams (0.1 mole) of 2-aminobenzyl chloride hydrochloride are thoroughly mixed and heated in an oil bath to 150° C. The mixture was maintained for 30 minutes at 150–160° C. After cooling down, the melt was recrystallized from butanol. The resultant 2-(2-methyl-5-chlorophenylamino)-4,5-benzo-6H-1,3-thiazine hydrochloride was found to be identical with that obtained in accordance with the procedure described in Example I.

*Example IV*

A solution of 9.2 grams (0.05 mole) of 2-chloromethylphenyl mustard oil (prepared from 2-aminobenzyl chloride hydrochloride with thiophosgene in water-ethylene chloride at 20° C.; boiling point 146° C.; yield 52%) and 6.0 grams (0.05 mole) of 2,6-dimethyl aniline in 50 cubic centimeters of absolute xylene was stirred for 2 hours under reflux. The separated oil soon crystallized. The product was recrystallized from ethanol. It melted at 186–188° C. and was found to be identical with the product described in Example I.

*Example V*

A mixture of 19.5 grams (0.1 mole) of dimethylmercapto-4,5-benzo-6H-1,3-thiazine and 17.8 grams (0.1 mole) of 2-methyl-5-chloroaniline hydrochloride was heated in an oil bath. The evolution of methylmercaptan began at about 90° C. The mixture was heated for 45 minutes at 120° C. and stirred as soon as it became liquid. The melt, which was glassy at room temperature, was dissolved in butanol. During the cooling down operation, the hydrochloride of 2-(2-methyl-5-chlorophenylamino)-4,5-benzo-6H-1,3-thiazine crystallized out and was found to be identical with the product obtained in accordance with the procedure outlined in Example I. It was found to melt at 215–220° C.

What is claimed is:

1. A chemical compound selected from the group consisting of 2-(2,6-dimethylphenylamino)-4,5-benzo-6H-1,3-thiazine; 2 - (2 - methyl-5-chlorophenylamino)-6H-4,5-benzo-1,3-thiazine and their hydrochloride salts.
2. The chemical compound, 2-(2,6-dimethylphenylamino)-4,5-benzo-6H-1,3-thiazine.
3. The chemical compound, 2-(2,6-dimethylphenylamino)-4,5-benzo-6H-1,3-thiazine hydrochloride.
4. The chemical compound, 2-(2-methyl-5-chlorophenylamino)-6H-4,5-benzo-1,3-thiazine.
5. The chemical compound, 2-(2-methyl-5-chlorophenylamino)-6H-4,5-benzo-1,3-thiazine hydrochloride.

References Cited in the file of this patent

Beilstein's Handbuch der Organischen Chemie, vol. 27, pp. 188 (1937).